US005770008A

United States Patent [19]

Murphy

[11] Patent Number: 5,770,008

[45] Date of Patent: Jun. 23, 1998

[54] STICKER DISPENSER

[75] Inventor: Jeffrey T. Murphy, Chaska, Minn.

[73] Assignee: The Miner Group, Minneapolis, Minn.

[21] Appl. No.: 806,313

[22] Filed: Feb. 26, 1997

[51] Int. Cl.$^6$ ...................... B32B 31/00

[52] U.S. Cl. .................. 156/579; 156/541; 156/577; 156/DIG. 48

[58] Field of Search .................. 156/540, 541, 156/574, 577, 579, DIG. 33, DIG. 48

[56] References Cited

U.S. PATENT DOCUMENTS

| | | | |
|---|---|---|---|
| 546,769 | 9/1895 | Martin et al. | 156/540 X |
| 3,265,553 | 8/1966 | Kind et al. | 156/540 X |
| 4,125,420 | 11/1978 | Hamisch, Jr. | 156/384 |
| 4,131,504 | 12/1978 | Furutu | 156/384 |
| 4,382,835 | 5/1983 | Sato et al. | 156/384 |
| 4,440,592 | 4/1984 | Sato et al. | 156/384 |
| 4,851,076 | 7/1989 | Manusch et al. | 156/579 X |
| 4,985,110 | 1/1991 | Becker | 156/540 |
| 5,258,090 | 11/1993 | Becker et al. | 156/384 |

*Primary Examiner*—David A. Simmons
*Assistant Examiner*—Paul M. Rivard
*Attorney, Agent, or Firm*—Gerald E. Helget; Mackall, Crounse & Moore, PLC

[57] ABSTRACT

A sticker dispenser for holding a tape of stickers and dispensing the stickers one at a time consists of a case; a loading door for inserting the stickers into the case; a movable plunger mounted to the case and movable between an extended position and a retracted position and biased in the extended position by a spring and the plunger having a gear rack; geared wheels meshing with the gear rack for moving the stickers out of the dispenser; and a sticker door for engaging and guiding the tape of stickers as it leaves the case.

16 Claims, 2 Drawing Sheets

STICKER DISPENSER

BACKGROUND OF THE INVENTION

The present invention is a dispenser for stickers, printed novelties, tattoos, static clings, labels, stamps or the like collectively referred to as stickers. Herewith, all of these items will be referred to as stickers for ease of understanding and simplicity.

In recent years, there has been a movement among children to collect and paste colored "stickers" into books or onto items such as schoolbooks, lunch buckets, etc. The stickers may show various animals or other subjects of interest to children.

The stickers may be purchased individually or on sheets of many stickers. However, in such arrangements the stickers are subject to becoming dirty or adhering accidentally to other items.

There is a need for a sticker dispenser which holds a tape of stickers and keeps the stickers from becoming dirty or sticking to other items. The sticker dispenser should allow the retailer to dispense stickers one at a time to the buyer. The sticker dispenser may also be used by the end user or buyer.

There is also a need for a self-adhesive label dispenser in the office.

SUMMARY OF THE INVENTION

A sticker dispenser for holding a tape of stickers and dispensing the stickers one at a time consists of a case; a loading door for inserting the stickers into the case; a movable plunger mounted to the case and movable between an extended position and a retracted position and biased in the extended position by a spring and the plunger having a gear rack; geared wheels meshing with the gear rack for moving the stickers out of the dispenser; and a sticker door for engaging and guiding the tape of stickers as it leaves the case.

A principal advantage of the present invention is that it keeps stickers, labels, printed novelties, tattoos, static clings and/or stamps clean and dry, yet allows them to be easily dispensed one at a time.

Another object and advantage of the present invention is that it allows stickers to be dispensed by using only one hand.

Another object and advantage of the present invention is that it optionally may automatically remove stickers from the backing tape as the stickers are dispensed.

Another object and advantage is that the dispenser may be molded into a variety of character shapes such as dolls, perfume bottles or other objects.

Another object and advantage of the present invention is that the plunger handle may be used as a place to put advertising material or pictures of the stickers contained in the dispenser.

Another object and advantage of the present invention is that it has few moving parts and is easily assembled and disassembled using only one assembly screw.

Another object and advantage of the present invention is that the moving parts do not contact the sticker tape until it is time to dispense a sticker. This prevents the moving parts from becoming sticky and also prevents the stickers from being damaged by pressure.

DETAILED DESCRIPTION OF THE PREFERRED EMBODIMENTS

Figure 1:
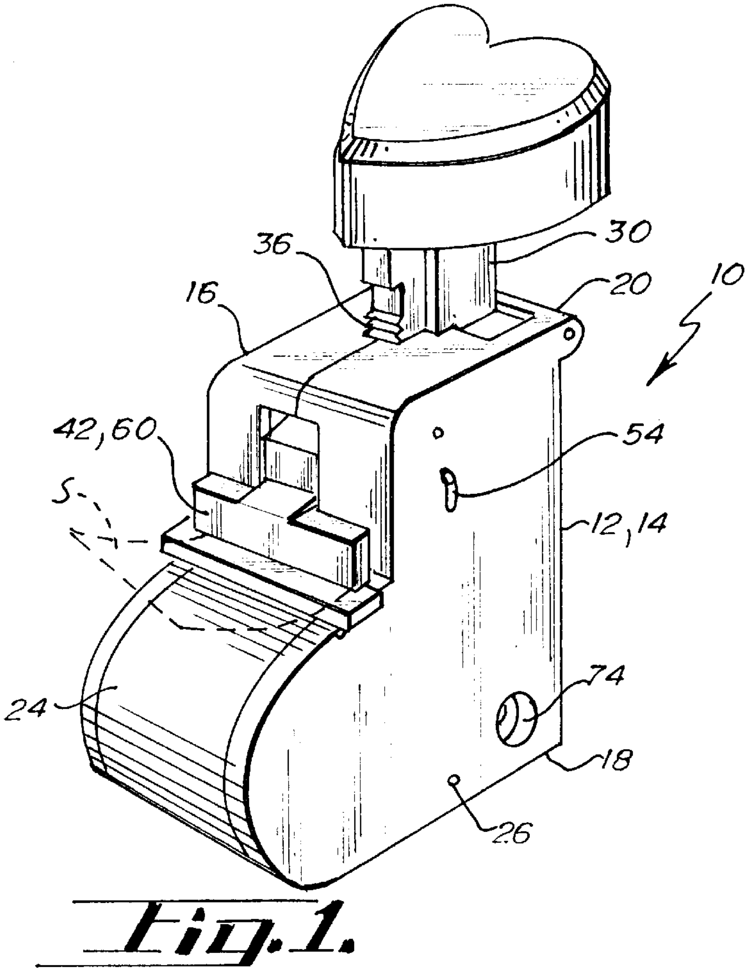
FIG. 1 is a perspective view of the sticker dispenser of the present invention.

The sticker dispenser of the present invention is shown in the Figures generally as reference numeral 10.

The sticker dispenser 10 has a case 12. The case 12 preferably comprises a right wall 14, left wall 16, bottom wall 18, and top wall 20.

Between the left wall 16 and right wall 14 the sticker dispenser 10 preferably has a loading door opening 22. A loading door 24 is preferably pivoted to the case 12 by a loading door pivot 26. The loading door opening 22 is adapted to allow insertion of a tape of stickers S into the case 12. The loading door 24 is adapted to partially close the loading door opening 22.

Figure 2A:
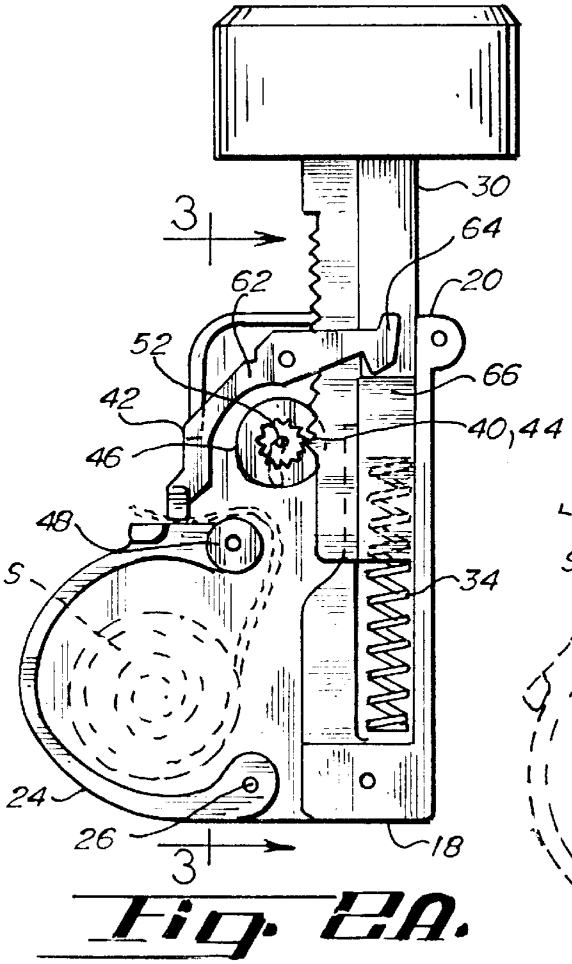
FIG. 2A is a side elevational view of the sticker dispenser of the present invention with some structure cut away to show the plunger in the extended position.
Figure 2B:
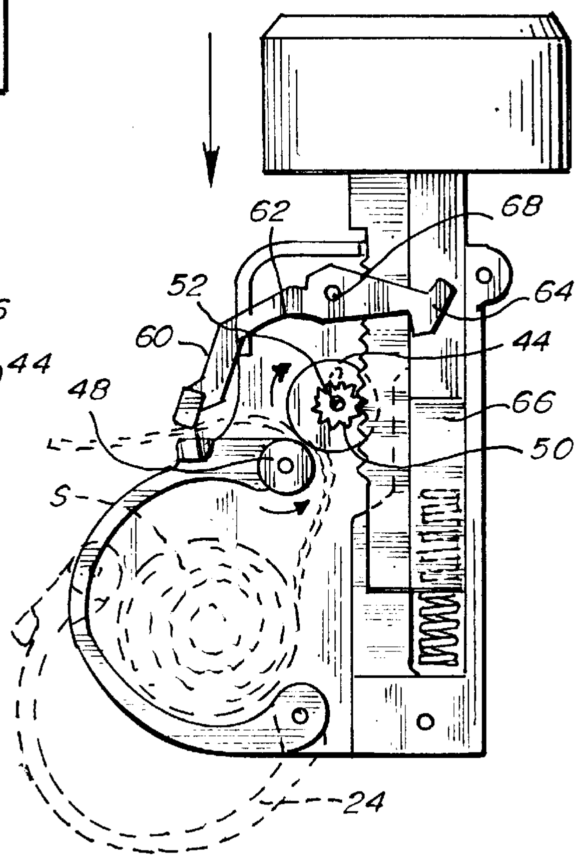
FIG. 2B is a side elevational view of the sticker dispenser of the present invention with some structure cut away to show the plunger in the retracted position. The loading door is shown in an open position in phantom.
Figure 3:
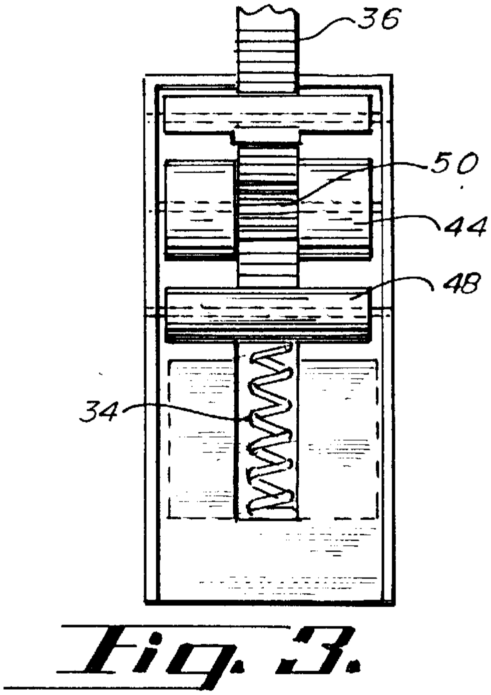
FIG. 3 is a cross section along the lines 3—3 of FIG. 2A.

A movable plunger 30 is mounted to the case and extends out of the case 12 through a plunger aperture 32 in the top wall 18 and is movable between an extended position (FIG. 2*a*) and a retracted position (FIG. 2*b*).

The plunger 30 is biased in the extended position by a spring 34.

A gear rack 36 is mounted on the plunger 30, preferably in a substantially vertical position.

The sticker dispenser 10 further comprises a sticker moving means 40 engaging the gear rack 36 for forcing the tape of stickers S out of the case 12.

The sticker dispenser 10 also comprises a sticker guiding means 42 mounted to the case 12 for engaging and guiding the tape of stickers S as it leaves the case 12.

The sticker moving means preferably comprises one or more sticker wheels 44 having a sticker engaging surface 46. The sticker engaging surface is preferably composed of some material, such as rubber, providing a frictional grip against the sticker tape S.

The sticker moving means 40 also preferably comprises an idler wheel 48. The idler wheel 48 is preferably mounted on the loading door 24. The sticker wheels 44 and idler wheel 48 engage the tape of stickers S therebetween when the plunger 30 is moved into the retracted position, thereby forcing the tape of stickers S out of the case 12, as shown in FIG. 2*b*.

The sticker wheels 44 are preferably mounted on sticker wheel gears 50, the sticker wheel gears 50 meshing with the gear rack 36. Preferably, the sticker wheel gears 50 are mounted on a sticker gear axle 52 and the sticker gear axle 52 is mounted to the case 12 in a substantially vertical, crescent-shaped slot 54, so that the sticker gear axle 52 moves downwardly and forwardly as the plunger 30 is moved into the retracted position, the downward and forward motion of the sticker gear axle 52 causing the sticker wheels 44 to contact the idler wheel 48, as shown in FIG. 2*b*.

Preferably, the sticker guiding means 42 comprises a sticker door 60 mounted on the case 12 on one end of a lever 62. The lever 62 preferably has a cam 64 on the end of the lever 62 opposite the sticker door 60. The cam 64 engages a cam block 66 mounted on the plunger 30.

Figure 6:
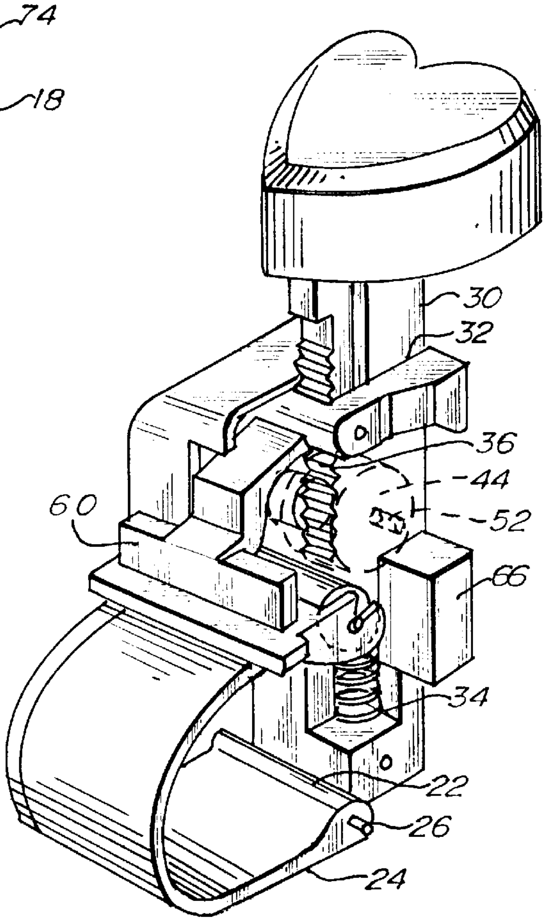
FIG. 6 is a perspective view of the sticker dispenser of the present invention with some structure cut away.

The lever 62 pivots about a fulcrum 68 and the lever 62 frictionally engages the plunger 30 as can be seen in FIG. 6. For example, the plunger 30 may pass through a slot in the lever 62 or the lever 62 may have arms on each side of the plunger 30. As can be seen in FIG. 2*a*, the sticker door 60 is biased against the loading door 24 by the spring 34 pushing the cam block 66 against the cam 64.

As the plunger 30 is moved into the retracted position (FIG. 2*b*), the cam block 66 disengages from the cam 64, releasing the sticker door 60 from its bias against the loading door 24. Simultaneously, the frictional engagement of the lever 62 with the plunger 30 causes the lever 62 to pivot about the fulcrum 68, thereby slightly raising the sticker door 60 from its engagement with the loading door 24 so that the tape of stickers S may be forced out of the case 12 between the sticker door 60 and the loading door 24.

When the plunger 30 is moved to the extended position, the spring will bias the cam block 66 against the cam 64, causing the lever 62 to pivot and bias the sticker door 60 against the loading door 24.

As can be seen, the structure of the sticker dispenser 10 allows one-handed operation to dispense stickers one at a time. Pressing the plunger causes the sticker door to open and a sticker to be pushed out of the dispenser. Releasing the plunger causes the sticker door to close. The sticker may then be torn off at a perforation line.

Figure 4:
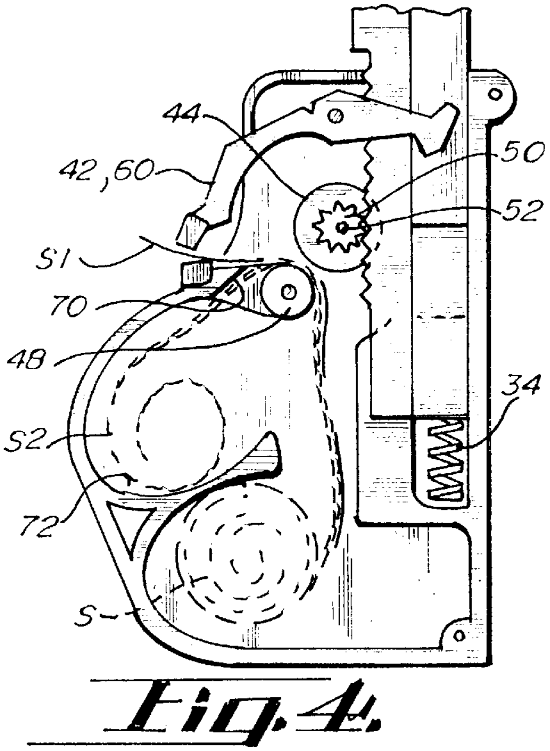
FIG. 4 is a side elevational view of a second embodiment of the sticker dispenser of the present invention with some structure cut away.

In a second embodiment (FIG. 4), the sticker dispenser 10 may include a backing tape separator 70 mounted on the loading door 24 and engaging the tape of stickers S so as to separate the stickers S1 from the backing tape S2 on which the stickers are mounted as the tape of stickers S is forced out of the case 12.

The sticker dispenser 10 may also include a backing tape takeup chamber 72 within the loading door 24 for receiving the backing tape S2 as the backing tape S2 is separated from the stickers S1.

The sticker dispenser is held together in structural integrity by an assembly screw 74 other equivalent means.

Figure 5:
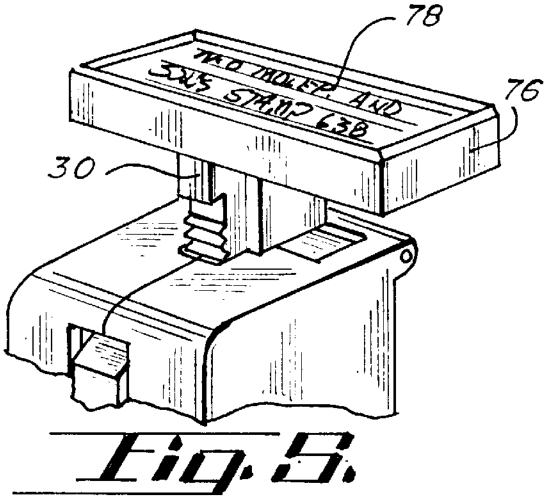
FIG. 5 is a detailed perspective view of the plunger showing advertising.

FIG. 5 shows an embodiment of the invention in which the plunger 30 has a handle 76 upon which may be placed advertising material 78.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A sticker dispenser for holding a tape of stickers and dispensing the stickers one at a time, comprising:

(a) a case;

(b) a loading door opening in the case and a loading door pivoted to the case adapted to allow insertion of a tape of stickers into the case;

(c) a movable plunger mounted to the case and movable between an extended position and a retracted position and biased in the extended position by a spring and the plunger having a gear rack thereon;

(d) sticker moving means engaging the gear rack for forcing the tape of stickers out of the case; and (e) sticker guiding means mounted to the case for engaging and guiding the tape of stickers as it leaves the case, wherein the sticker guiding means comprises a movable sticker door mounted on the case and cooperating with the loading door to close the loading door opening with the tape of stickers extending out of the case between the sticker door and the loading door.

2. A sticker dispenser according to claim 1, wherein the sticker moving means comprises one or more sticker wheels having a sticker engaging surface.

3. A sticker dispenser according to claim 2, wherein the sticker moving means further comprises an idler wheel, the one or more sticker wheels and idler wheel engaging the tape of stickers therebetween when the plunger is moved into the retracted position and thereby forcing the tape of stickers out of the case.

4. A sticker dispenser according to claim 3, wherein the sticker wheels are mounted on sticker wheel gears meshing with the gear rack.

5. A sticker dispenser according to claim 4, wherein the sticker wheel gears are mounted on a sticker gear axle and wherein the sticker gear axle is mounted to the case in a substantially vertical, crescent-shaped slot, so that the sticker gear axle moves downwardly and forwardly as the plunger is moved to the retracted position, the downward and forward motion of the sticker gear axle thereby causing the sticker wheel to contact the idler wheel.

6. A sticker dispenser according to claim 5, wherein the sticker door is mounted to the case on one end of a lever, the lever having a cam on the end opposite the sticker door and the cam engaging a cam block mounted on the plunger and the lever pivoting about a fulcrum and the lever frictionally engaging the plunger, the sticker door being biased against the loading door by the spring pushing the cam block against the cam, and whereby moving the plunger to the retracted position causes the cam block to disengage from the cam and causes the lever to pivot thereby slightly raising the sticker door from its engagement with the loading door so that the tape of stickers may be forced out of the case between the sticker door and the loading door.

7. A sticker dispenser according to claim 1, further comprising a backing tape separator mounted on the loading door and engaging the tape of stickers so as to separate the stickers from the backing tape as the tape of stickers is forced out of the case.

8. A sticker dispenser according to claim 5, further comprising a backing tape takeup chamber within the loading door for receiving the backing tape as the backing tape is separated from the stickers.

9. A sticker dispenser for holding a tape of stickers and dispensing the stickers one at a time, comprising:

(a) a case having a left wall, right wall, bottom wall, and top wall;

(b) a loading door opening in the case between the left wall and right wall for inserting a tape of stickers in the case;

(c) a loading door pivoted on the bottom wall and adapted to partially close the loading door opening;

(d) a movable plunger mounted to the case and extending out of the case through a plunger aperture in the top wall and movable between and extended position and a retracted position, the plunger being biased in the extended position by a spring;

(e) a gear rack mounted substantially vertically on the plunger;

(f) one or more sticker wheels having a sticker-engaging surface and mounted on a sticker wheel gear, the sticker wheel gear having a sticker gear axle and turning thereon, the sticker wheel gear meshing with the gear rack;

(g) an idler wheel mounted on the loading door, the idler wheel and th( one or more sticker wheels engaging the tape of stickers therebetween when the plunger is moved into the retracted position and thereby forcing the tar of stickers out of the case through the loading door opening; and (h) a movable sticker door mounted on the case and cooperating with the loading door to close the loading door opening with the tape of stickers extending out of the case between the sticker door and the loading doors, whereby moving the plunger into the retracted position causes the sticker wheel gears to turn on the gear rack and causing the one or more sticker wheels to engage the tape of stickers against the idler wheel and thereby force the tape of stickers out of the case.

10. A sticker dispenser according to claim 9, wherein the sticker gear axle is mounted to the case in a substantially vertical, crescent-shaped slot, so that the sticker gear axle moves downwardly and forwardly as the plunger is moved into the retracted position, the downward and forward motion of the sticker gear axle thereby causing the one or more sticker wheels to contact the idler wheel.

11. A sticker dispenser according to claim 9, wherein the sticker door is mounted to the case on one end of a lever, the lever having a cam on the end opposite the sticker door and the cam engaging a cam block mounted on the plunger and the lever pivoting about a fulcrum and the lever frictionally engaging the plunger, the sticker door being biased against the loading door by the spring pushing the cam block against the cam, and whereby moving the plunger to the retracted position causes the cam block to disengage from the cam and causes the lever to pivot thereby slightly raising the sticker door from its engagement with the loading door so that the tape of stickers may be forced out of the case between the sticker door and the loading door.

12. A sticker dispenser according to claim 9, further comprising a backing tape separator mounted on the loading door and engaging the tape of stickers so as to separate the stickers from the backing tape as the tape of stickers is forced out of the case.

13. A sticker dispenser according to claim 12, further comprising a backing tape takeup chamber within the loading door for receiving the backing tape as the backing tape is separated from the stickers.

14. A sticker dispenser for holding a tape of stickers and dispensing the stickers one at a time, comprising:

(a) a case having a left wall, right wall, bottom wall, and top wall;

(b) a loading door opening in the case between the left wall and right wall for inserting a tape of stickers in the case;

(c) a loading door pivoted on the bottom wall and adapted to partially close the loading door opening;

(d) a movable plunger mounted to the case and extending out of the case through a plunger aperture in the top wall and movable between and extended position and a retracted position, the plunger being biased in the extended position by a spring;

(e) a gear rack mounted substantially vertically on the plunger;

(f) an idler wheel mounted on the loading door;

(g) one or more sticker wheels having a sticker-engaging surface and mounted on a sticker wheel gear, the sticker wheel gear having a sticker gear axle and turning thereon, the sticker wheel gear meshing with the gear rack, wherein the sticker gear axle is mounted to the case in a substantially vertical, crescent-shaped slot, so that the sticker gear axle moves downwardly and forwardly as the plunger is moved into the retracted position, the downward and forward motion of the sticker gear axle thereby causing the one or more sticker wheels to contact the idler wheel, the idler wheel and the one or more sticker wheels engaging the tape of stickers therebetween and thereby forcing the tape of stickers out of the case through the loading door opening; and (h) a movable sticker door mounted on the case and cooperating with the loading door to close the loading door opening with the tape of stickers extending out of the case between the sticker door and the loading door, wherein the sticker door is mounted to the case on one end of a lever, the lever having a cam on the end opposite the sticker door and the cam engaging a cam block mounted on the plunger and the lever pivoting about a fulcrum and the lever frictionally engaging the plunger, the sticker door being biased against the loading door by the spring pushing the cam block against the cam, and whereby moving the plunger to the retracted position causes the cam block to disengage from the cam and causes the lever to pivot thereby slightly raising the sticker door from its engagement with the loading door so that the tape of stickers may be forced out of the case between the sticker door and the loading door.

15. A sticker dispenser according to claim 14, further comprising a backing tape separator mounted on the loading door and engaging the tape of stickers so as to separate the stickers from the backing tape as the tape of stickers is forced out of the case.

16. A sticker dispenser according to claim 15, further comprising a backing tape takeup chamber within the loading door for receiving the backing tape as the backing tape is separated from the stickers.

* * * * *

UNITED STATES PATENT AND TRADEMARK OFFICE

CERTIFICATE OF CORRECTION

PATENT NO. : 5,770,008

DATED : June 23, 1998

INVENTOR(S) : Jeffrey T. Murphy

It is certified that error appears in the above-identified patent and that said Letters Patent is hereby corrected as shown below:

Column 5, line 7, delete "th(" and insert --the--.

Column 5, line 10, delete "tar" and insert --tape--.

Signed and Sealed this

Twenty-eighth Day of November, 2000

Attest:

Q. TODD DICKINSON

*Attesting Officer*

*Director of Patents and Trademarks*